US012680685B2

(12) United States Patent
Li

(10) Patent No.: US 12,680,685 B2
(45) Date of Patent: Jul. 14, 2026

(54) LIGHT HEAD WITH LIGHT SENSOR AND FLASHLIGHT

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 19/231,574

(22) Filed: Jun. 9, 2025

(65) Prior Publication Data

US 2025/0297731 A1 Sep. 25, 2025

Related U.S. Application Data

(63) Continuation of application No. PCT/CN2024/075564, filed on Feb. 2, 2024.

(30) Foreign Application Priority Data

Nov. 8, 2023 (CN) ......................... 202323026545.3

(51) Int. Cl.
*F21V 23/04* (2006.01)
*F21L 4/00* (2006.01)
(Continued)

(52) U.S. Cl.
CPC .......... *F21V 23/0442* (2013.01); *F21L 4/005* (2013.01); *F21V 7/04* (2013.01);
(Continued)

(58) Field of Classification Search
CPC .. F21V 31/005; F21V 19/003; F21V 19/0442; F21V 7/12; F21V 7/005; F21V 7/04
See application file for complete search history.

(56) References Cited

U.S. PATENT DOCUMENTS 9,474,128 B2 * 10/2016 Hoang .................. F21V 23/005
11,713,852 B1 * 8/2023 Wei ......................... F21V 5/006
362/157

(Continued)

FOREIGN PATENT DOCUMENTS

CN 201706219 U 1/2011
CN 105782767 A 7/2016

(Continued)

OTHER PUBLICATIONS

Innovation Q+NPL (Year: 2025).*
International Search Report of PCT Patent Application No. PCT/CN2024/075564 issued on Jun. 7, 2024.

*Primary Examiner* — Anabel Ton

(57) ABSTRACT

The present invention relates to a light head with a light sensor, including a lamp holder, a reflector and a control circuit board. The reflector is installed inside a hollow structure, and is equipped with an installation port, a light-emitting port and an imaging hole. A light source is installed in the installation port and is electrically connected to the control circuit board. The imaging hole is equipped with a light sensor and an inner wall of the imaging hole forms a reflective surface. A diffusely reflected light enters through the imaging hole. A portion of the light is directly projected onto the light sensor, while another portion of the light is reflected off the reflective surface to the light sensor. The light sensor determines whether to adjust the brightness of the light source based on the light intensity.

9 Claims, 6 Drawing Sheets

(51) Int. Cl.

| | |
|---|---|
| ***F21V 7/04*** | (2006.01) |
| ***F21V 17/00*** | (2006.01) |
| ***F21V 17/12*** | (2006.01) |
| ***F21V 19/00*** | (2006.01) |
| ***F21V 23/00*** | (2015.01) |
| ***F21V 31/00*** | (2006.01) |

(52) U.S. Cl.
CPC ............ *F21V 17/005* (2013.01); *F21V 17/12* (2013.01); *F21V 19/003* (2013.01); *F21V 23/004* (2013.01); *F21V 31/005* (2013.01)

(56) References Cited

U.S. PATENT DOCUMENTS

| | | | |
|---|---|---|---|
| 2014/0268790 | A1 | 9/2014 | Chobot et al. |
| 2016/0050736 | A1 | 2/2016 | Hoang |
| 2023/0204168 | A1 | 6/2023 | Bertken et al. |

FOREIGN PATENT DOCUMENTS

| | | | | |
|---|---|---|---|---|
| CN | 210241225 | U | | 4/2020 |
| CN | 212298619 | U | | 1/2021 |
| CN | 212361648 | U | | 1/2021 |
| CN | 214369429 | U | * | 10/2021 |
| CN | 115183166 | A | | 10/2022 |
| CN | 219867641 | U | | 10/2023 |
| CN | 219876205 | U | | 10/2023 |
| CN | 220321235 | U | | 1/2024 |

* cited by examiner

LIGHT HEAD WITH LIGHT SENSOR AND FLASHLIGHT

CROSS REFERENCE TO RELATED APPLICATIONS

The present application is a Continuation Application of PCT Application No. PCT/CN2024/075564 filed on Feb. 2, 2024, which claims the benefit of Chinese Patent Application No. 202323026545.3 filed on Nov. 8, 2023. All the above are hereby incorporated by reference in their entirety.

TECHNICAL FIELD

The present invention relates to a field of flashlight technology, in particularly, to a light head with a light sensor and a flashlight.

BACKGROUND

To adapt to different application scenarios, existing flashlights are equipped with multiple brightness levels, including low, medium, and high. When users use a flashlight and activate a brightness level of high moving forward, the light shines on various obstacles. Whether the obstacles are closer or further, the flashlight remains at the brightness level of high and cannot automatically switch levels, resulting in significant power consumption.

Additionally, if the flashlight was accidentally switched to high and was placed in a backpack, due to the block by items inside the backpack, the temperature of the light head may easily become too high under the scenario of the flashlight remaining at a level of high. This situation, on one hand, affects the lifespan of the light source, and on the other hand, potentially causes safety accidents such as burning the backpack.

SUMMARY

The objective of the present invention is to overcome difficulties of existing flashlights in sensing a distance between a light head and obstacles and unable to automatically adjust brightness, which lead to power wastage and safety issues. The present invention provides a light head with a light sensor and a flashlight.

To solve the above-mentioned technical problems, a technical solution adopted by the present invention is as follows: a light head with a light sensor includes a lamp holder, a reflector and a control circuit board. The lamp holder equips a hollow structure inside, and an end of the lamp holder is equipped with an opening that connects to the hollow structure. The reflector is installed inside the hollow structure. One end of the reflector is equipped with an installation port while the other end of the reflector is equipped with a light-emitting port. A light source is installed in the installation port and is electrically connected to the control circuit board. An imaging hole is set in the reflector along the direction of light emission. At an end of the imaging hole away from the opening, there is a light sensor electrically connected to the control circuit board. An inner wall of the imaging hole forms a reflective surface that directs light to the light sensor.

In this technical solution, when a light emitted forward by the light source is blocked by an obstacle, the light produces diffuse reflection on the obstacle. A diffusely reflected light enters through the imaging hole set in the reflector. A portion of the light is directly projected onto the light sensor, while another portion of the light is reflected off the reflective surface to the light sensor. The light sensor transmits a perceived light intensity data to the control circuit board, which then determines whether to adjust the brightness of the light source based on the light intensity, thus avoiding power wastage and potential safely hazards.

Preferably, another end of the lamp holder is equipped with a mounting plate which equips a lamp board located inside the hollow structure. The light source is connected to the lamp board. The lamp board is electrically connected to the control circuit board. The light sensor is mounted on the lamp board.

Preferably, the lamp board is equipped with a centering member, which equips a positioning through-slot. The light source is housed in the positioning through-slot. The centering member is equipped with a first positioning structure, and a bottom of the reflector is equipped with a second positioning structure that corresponds to the first positioning structure, where the second positioning structure is interlocked with the first positioning structure.

Preferably, the first positioning structure includes at least two positioning pins located on the centering member. The second positioning structure includes at least two positioning holes located on the bottom of the reflector. Each positioning pin is respectively inserted into the corresponding positioning hole.

Preferably, a positioning slot is set onto the lamp board, and the centering member is equipped with a positioning member that corresponds to the positioning slot, where the positioning member is inserted into the positioning slot.

Preferably, the mounting plate is equipped with a through-hole for the passage of wires connecting the lamp board and the control circuit board.

Preferably, an outer wall of the reflector is in contact with an inner wall of the hollow structure along the axis of the lamp holder. The imaging hole is located on the reflector between the outer wall and the inner wall of the reflector.

Preferably, a circular mounting platform is formed on the lamp holder at the opening. The mounting platform is equipped with a sealing ring. A mounting slot, which holds a lens, is formed at an inner wall of the sealing ring. The opening is removably connected to a pressing ring securing the sealing ring.

Preferably, the lamp holder is equipped with an internal thread at the opening, and the pressing ring is equipped with an external thread that is threadedly connected to the internal thread.

The present invention further provides a flashlight, including a barrel with a power source inside. The flashlight also includes the light head with a light sensor as described above. The lamp holder is connected to the barrel, and the power source is connected to the control circuit board.

Compared with prior art, the beneficial effects of the present invention are as follows. In the present invention, when a light emitted forward by the light source is blocked by an obstacle, the light produces diffuse reflection on the obstacle. A diffusely reflected light enters through the imaging hole set in the reflector. A portion of the light is directly projected onto the light sensor, while another portion of the light is reflected off the reflective surface to the light sensor. The light sensor transmits a perceived light intensity data to the control circuit board, which then determines whether to adjust the brightness of the light source based on the light intensity, thus avoiding power wastage and potential safely hazards.

Figure 1:
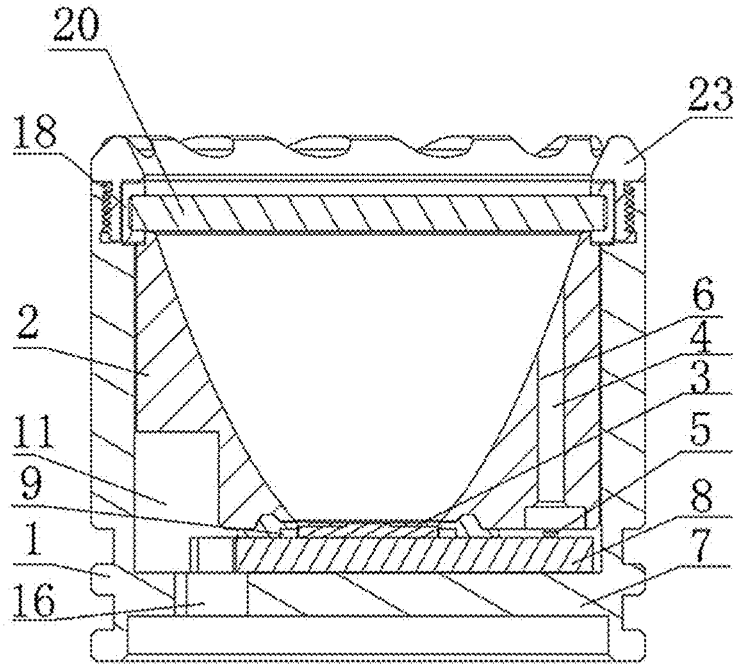
FIG. 1 is a sectional view of the light head with a light sensor of the present invention.
Figure 2:
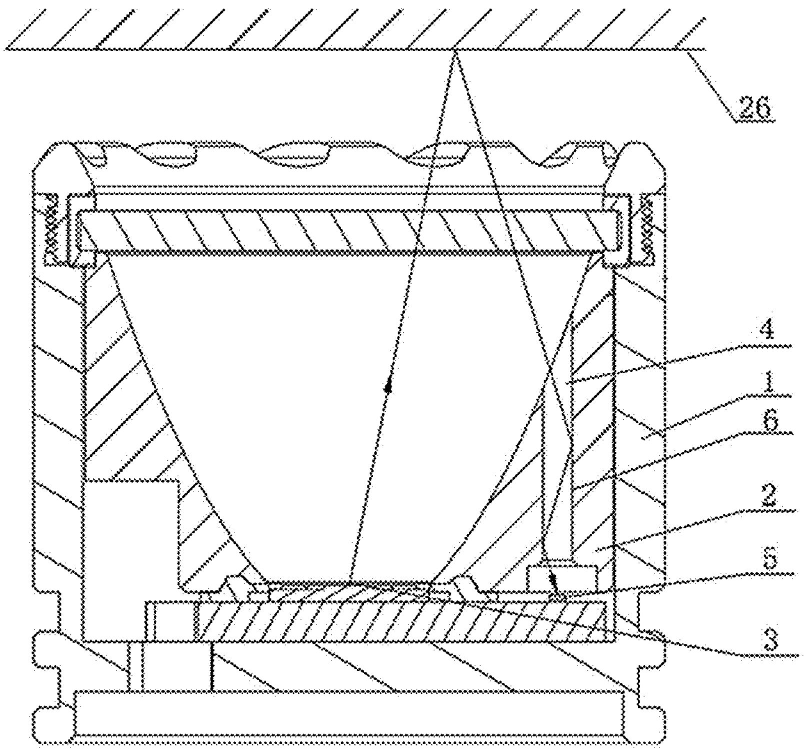
FIG. 2 is a schematic diagram of an application scenario of the light head of the present invention.

Reference numerals in the figures are described as follows.

1, lamp holder; 2, reflector; 11, hollow structure; 12, opening; 21, installation port; 22, light-emitting port; 3, light source; 4, imaging hole; 5, light sensor; 6, reflective surface; 7, mounting plate; 8, lamp board; 9, centering member; 10, positioning through-slot; 13, first positioning structure; 14, second positioning structure; 131, positioning pin; 141, positioning hole; 15, positioning slot; 24, positioning member; 16, through-hole; 17, mounting platform; 18, sealing ring; 19, mounting slot; 20, lens; 23, pressing ring; 25, control circuit board; and 26, obstacle.

DETAILED DESCRIPTION OF EMBODIMENTS

To make objectives, technical solutions and advantages of the embodiments of the present application clearer, the following will be described in further detail below in conjunction with embodiments, the embodiments, however, do not limit the scope of the present invention in any form.

In the embodiments, the terms "first" and "second" are used solely for descriptive purposes and should not be construed as indicating or implying relative importance, or as implicitly specifying the quantity of the technical features indicated. Therefore, features defined by "first" and "second" may explicitly or implicitly include one or more of such features. In the description of the embodiments of this application, unless otherwise specified, the term "multiple" means two or more.

Furthermore, in the embodiments, directional terms such as "upper", "lower", "left" and "right" are defined relative to the orientation of the components illustrated in the drawings. It should be understood that these directional terms are relative concepts and are used for descriptive and clarifying purposes. They may change accordingly based on the orientation of the components in the drawings.

In the embodiments, unless otherwise explicitly specified and defined, the term "connect" should be broadly understood. For example, "connect" can mean fixed connection, detachable connection, or integral formation; it can also mean direct connection or indirect connection through an intermediate medium.

In the embodiments, the terms "include", "comprise", or any other variants are intended to cover non-exclusive inclusion. This means that a process, method, item, or device that includes a series of elements not only includes those elements but also includes other elements not explicitly listed, or may include elements inherent to such a process, method, item, or device. In the absence of further limitations, an element defined by the phrase "including a . . . " does not exclude the presence of additional identical elements in the process, method, item, or device that includes the element.

In the embodiments, words such as "exemplary" or "for example" are used to indicate examples, illustrations, or explanations. Any embodiment or design solution described as "exemplary" or "for example" in the embodiments of this application should not be interpreted as being more preferred or advantageous than other embodiments or design solutions. Rather, the use of terms such as "exemplary" or "for example" is intended to present the relevant concepts in a specific manner.

Embodiment 1

As shown in FIG. 1 to FIG. 7, a light head with a light sensor includes a lamp holder 1, a reflector 2 and a control circuit board 25. The lamp holder 1 equips a hollow structure 11 inside, and an end of the lamp holder 1 is equipped with an opening 12 that connects to the hollow structure 11. The reflector 2 is installed inside the hollow structure 11. One end of the reflector 2 is equipped with an installation port 21 while the other end of the reflector 2 is equipped with a light-emitting port 22. A light source 3 is installed in the installation port 21 and is electrically connected to the control circuit board 25. An imaging hole 4 is set in the reflector 3 along the direction of light emission. At an end of the imaging hole 4 away from the opening 12, there is a light sensor 5 electrically connected to the control circuit board 25. An inner wall of the imaging hole 4 forms a reflective surface 6 that directs light to the light sensor 5.

In this embodiment, when a light emitted forward by the light source 3 is blocked by an obstacle 26, the light produces diffuse reflection on the obstacle 26. A diffusely reflected light enters through the imaging hole 4 set in the reflector 2 (the imaging hole 4 is a through-hole set on the reflector 2). A portion of the light is directly projected onto the light sensor 5, while another portion of the light is reflected off the reflective surface 6 to the light sensor 5. The light sensor 5 transmits a perceived light intensity data to the control circuit board 25, which then determines whether to adjust the brightness of the light source 3 based on the light intensity, thus avoiding power wastage and potential safely hazards. It should be noticed that the closer the light head is to the obstacle 26, the more light diffusely reflected by the obstacle 26 enters the imaging hole 4, leading the higher the light intensity perceived by the light sensor 5. The control circuit board 25 determines whether to reduce the brightness of the light source 3 or turn off the light source 3 based on a feedback value of the light intensity. Specifically, the control circuit board 25 can determine based on a set threshold. The control circuit board 25 reduces the brightness of the light source 3 when the feedback value is higher than the set threshold. If the feedback value is significantly higher than the set threshold, the control circuit board 25 can also turn off the light source 3. This prevents fire safety hazards caused by the light head being too close to the obstacle 26 and irradiating the obstacle 26 at a high brightness level. It should also be noticed that to avoid emitted-directly light (emitted-directly light refers light that has not been diffusely reflected by the obstacle 26) from the light source 3 entering the imaging hole 4, the size of the imaging hole 4 should be relatively small. Since the imaging hole 4 is small, if the light entering the imaging hole 4 can only be perceived by the light sensor 5 when traveling in a straight line, it will increase the difficulty for the light diffusely reflected by the obstacle 26 to enter the imaging hole 4 and be perceived by the light sensor 5. To enable the light diffusely reflected by the obstacle 26 to be better perceived by the light sensor 5, a reflective surface 6 is formed on an inner wall of the imaging hole 4. The reflective surface 6 allows the light entering the imaging hole 4 to be perceived by the light sensor 5 after multiple reflections, thereby reducing the difficulty for the light diffusely reflected by the obstacle 26 to enter the imaging hole 4 and be perceived by the light sensor 5. In this embodiment, there are many types of the light sensor 5, which can be a photodiode, a photoresistor, a photodiode array, a phototransistor, a photodiode array and a phtotransistor, etc. This embodiment does not specifically limit the light sensor 5. As a person skilled in the art, appropriate adjustments can be made according to requirements. Additionally, the light source 3 in this embodiment can be an light-emitting diode (LED) light, a halogen lamp or a xenon lamp. This embodiment does not specifically limit the light source 3. As a person skilled in the art, appropriate adjustments can also be made according to requirements. It also needs to be explained that the position of the control circuit board 25 can be reasonably set according to requirements. The control circuit board 25 can be set inside the light head or inside a barrel (the barrel refers to the portion connected to the light head).

Figure 3:
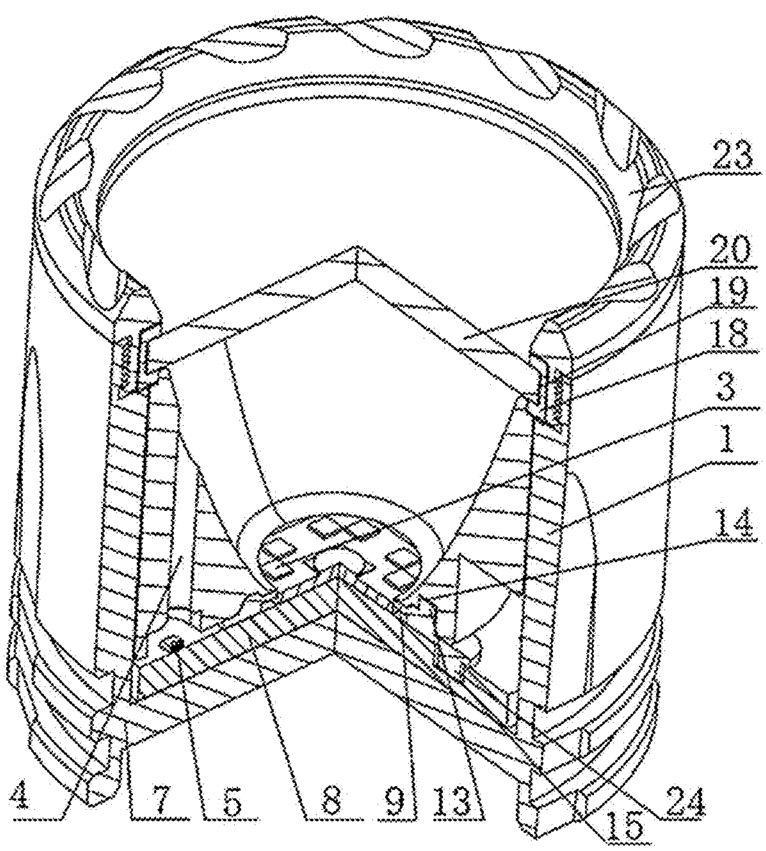
FIG. 3 is a partial sectional view of the head light of the present invention.
Figure 4:
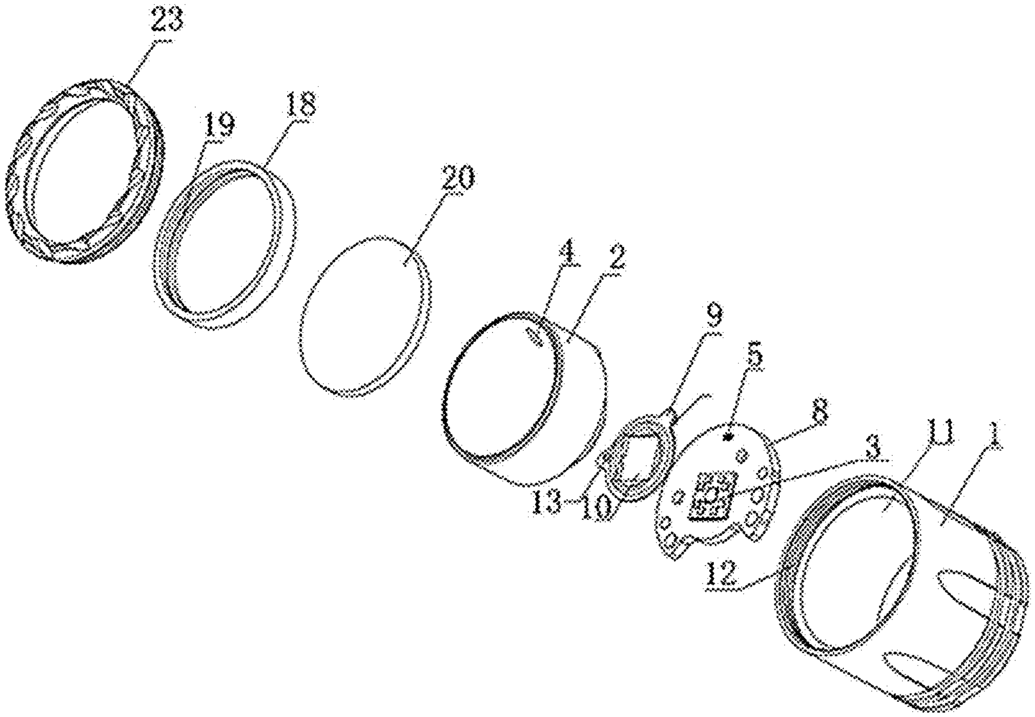
FIG. 4 is an exploded view of the head light of the present invention.
Figure 5:
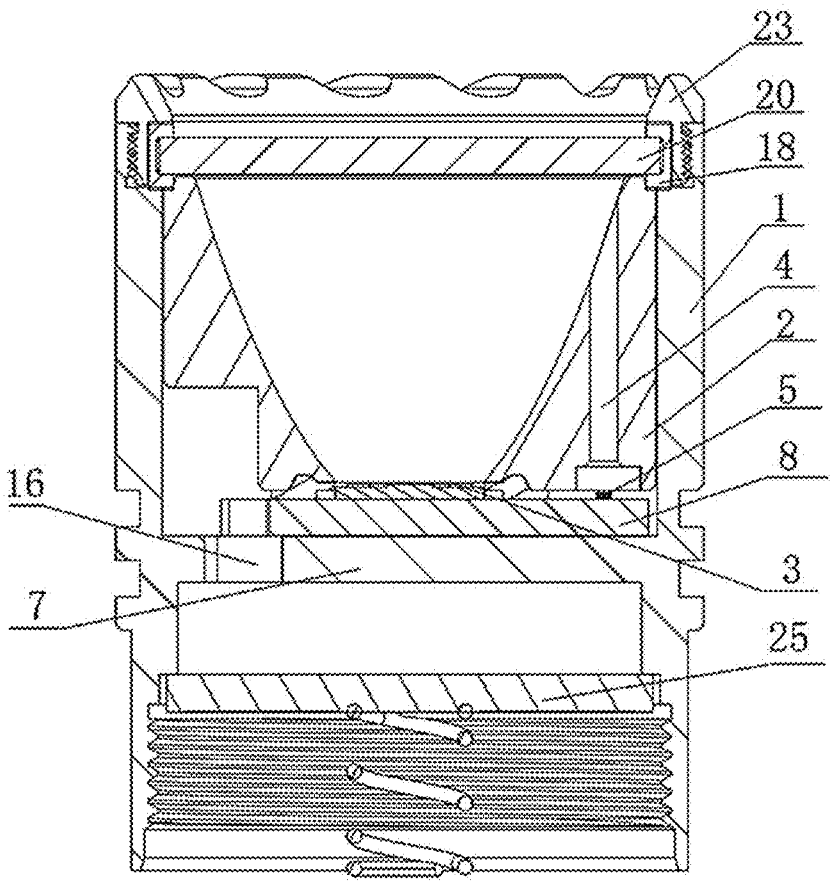
FIG. 5 is a structural diagram of the control circuit board placed in the head light of the present invention.
Figure 6:
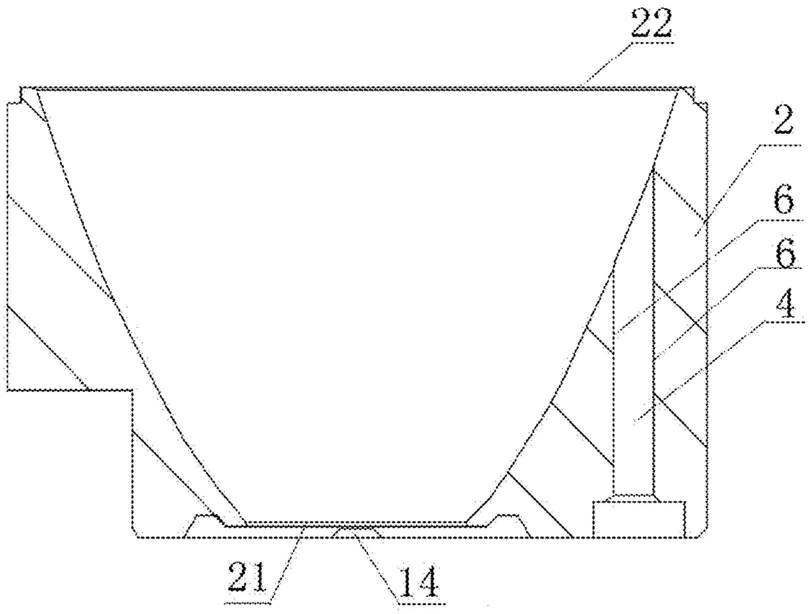
FIG. 6 is a sectional view of the reflector of the head light of the present invention.
Figure 7:
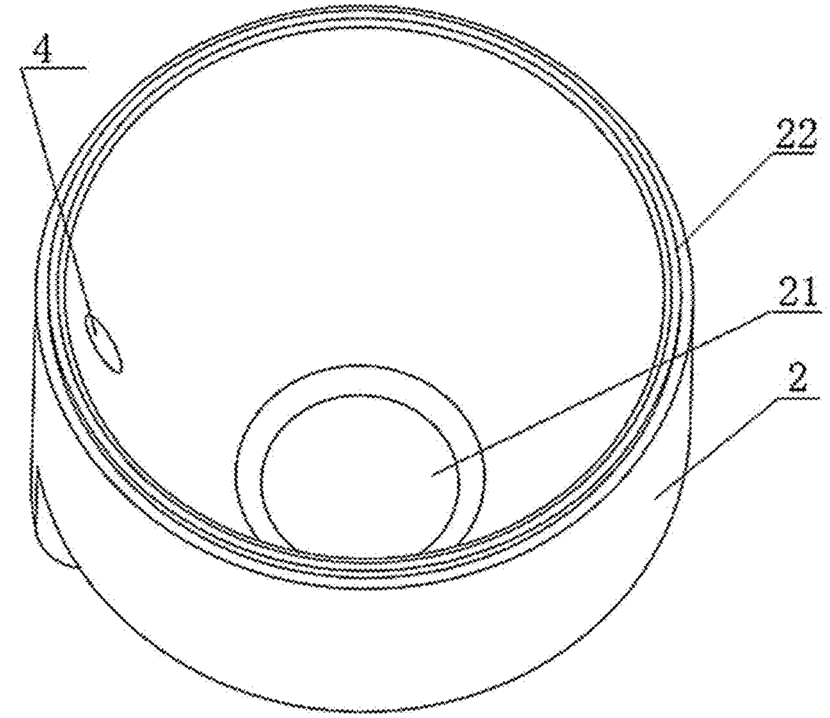
FIG. 7 is a perspective view of the reflector from the top view.

As shown in FIG. 1, FIG. 3 and FIG. 5, another end of the lamp holder 1 is equipped with a mounting plate 7 which equips a lamp board 8 located inside the hollow structure 11. The light source 3 is connected to the lamp board 8. The lamp board 8 is electrically connected to the control circuit board 25. The light sensor 5 is mounted on the lamp board 8. In this embodiment, the another end of the lamp holder 1 refers to the opposite to the end with the opening 12. Since the another end of the lamp holder 1 forms the mounting plate 7, the mounting plate 7 can be used to install the lamp board 8, providing a mounting position for the lamp board 8. It should be noted that since the light source 3 is installed on the lamp board 8 and the lamp board 8 is electrically connected to the control circuit board 25, it allows that the light source 3 is indirectly connected to the control circuit board 25. The control circuit board 25 can adjust the brightness of the light source 3 through the lamp board 8.

As shown in FIG. 1, FIG. 3, FIG. 4, FIG. 6 and FIG. 9, the lamp board 8 is equipped with a centering member 9 which equips a positioning through-slot 10. The light source 3 is housed in the positioning through-slot 10. The centering member 9 is equipped with a first positioning structure 13, and a bottom of the reflector 2 is equipped with a second positioning structure 14 that corresponds to the first positioning structure 13, where the second positioning structure 14 is interlocked with the first positioning structure 13. In this embodiment, since the light source 3 and the light sensor 5 are mounted on the lamp board 8, and the light source 3 is housed in the positioning through-slot 10, the positioning through-slot 10 is capable to position the light source 3. When the reflector 2 is installed inside the hollow structure 11, the light source 3 is installed in the installation port 21, thereby preventing the light emitted by the light source 3 from escaping through a gap between the light source 3 and the installation port 21 and being perceived by the light sensor 5. It should be noted that a first annular pressing platform is formed on the centering member 9, protruding towards the light source 3 on the outside of the positioning through-slot 10. A second annular pressing platform is formed at the edge of the installation port 21. When the reflector 2 is installed in the hollow structure 11, the first annular pressing platform is contacted with the second annular pressing platform to prevent light leakage. In addition, since the light sensor 5 is set on the control circuit board 25, the imaging hole 4 needs to correspond in position to the light sensor 5. While when installing the reflector 2, the light sensor 5 is located below the reflector 2, making it difficult to observe an exact position of the light sensor 5. By having the first positioning structure 13 equipped on the sentering member 9 and the second positioning structure 14 equipped on the bottom of the reflector 2, and interlocking the second positioning structure 14 with the first positioning structure 13, on one hand, it can ensure that the position of the imaging hole 4 corresponds to the position of the light sensor 5, facilitating the accurate installation of the reflector 2; on the other hand, it can also ensure that the light source 3 is centrally positioned in the installation port 21.

Figure 8:
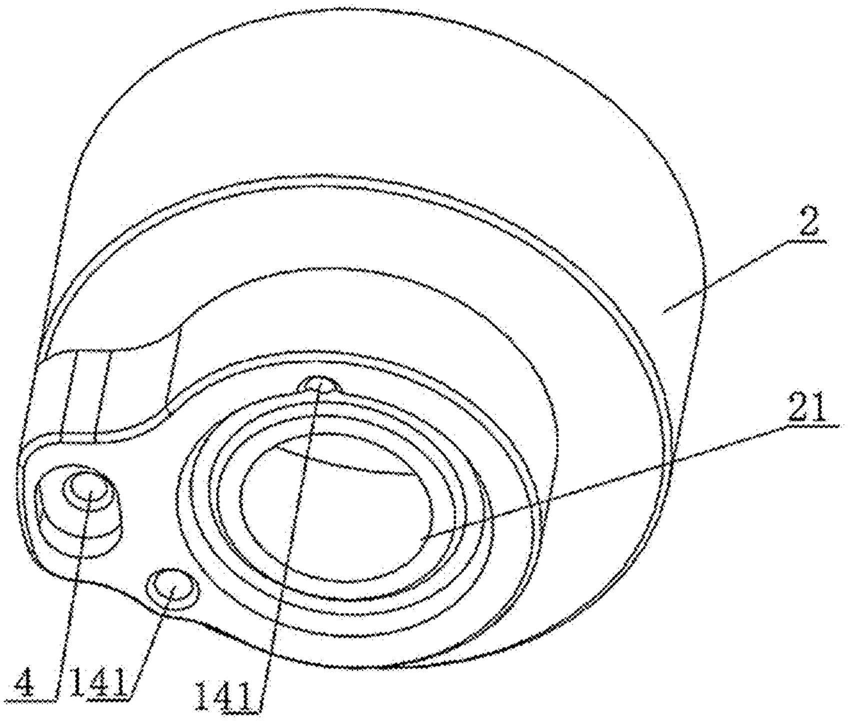
FIG. 8 is a perspective view of the reflector from the bottom view.
Figure 9:
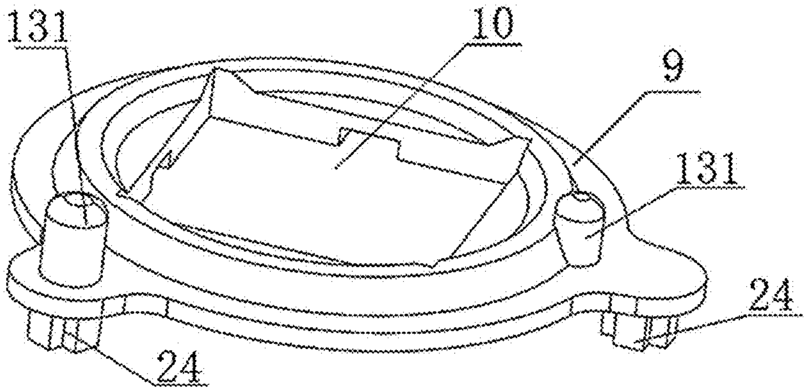
FIG. 9 is a perspective view of the centering member of the head light of the present invention.

As shown in FIG. 8 and FIG. 9, the first positioning structure 13 includes at least two positioning pins 131 located on the centering member 9. The second positioning structure 14 includes at least two positioning holes 141 located on the bottom of the reflector 2. Each positioning pin 131 is respectively inserted into the corresponding positioning hole 141. In this embodiment, since the two positioning pins 131 are respectively inserted into the two positioning holes 141, it can ensure the positional correspondence between the light sensor 5 and the imaging hole 4.

Figure 10:
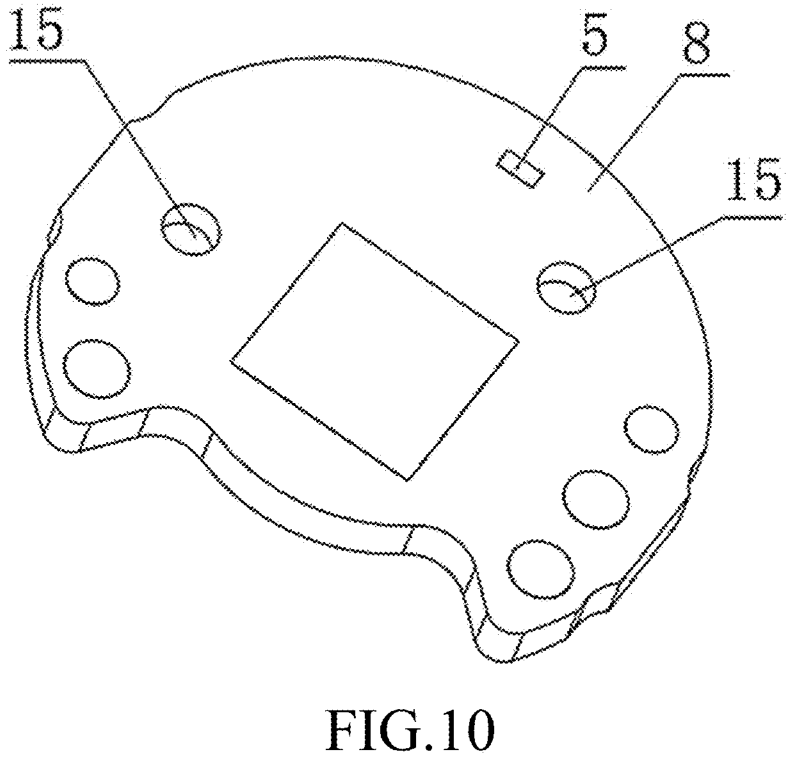
FIG. 10 is a perspective view of the lamp board of the head light of the present invention.
Figure 11:
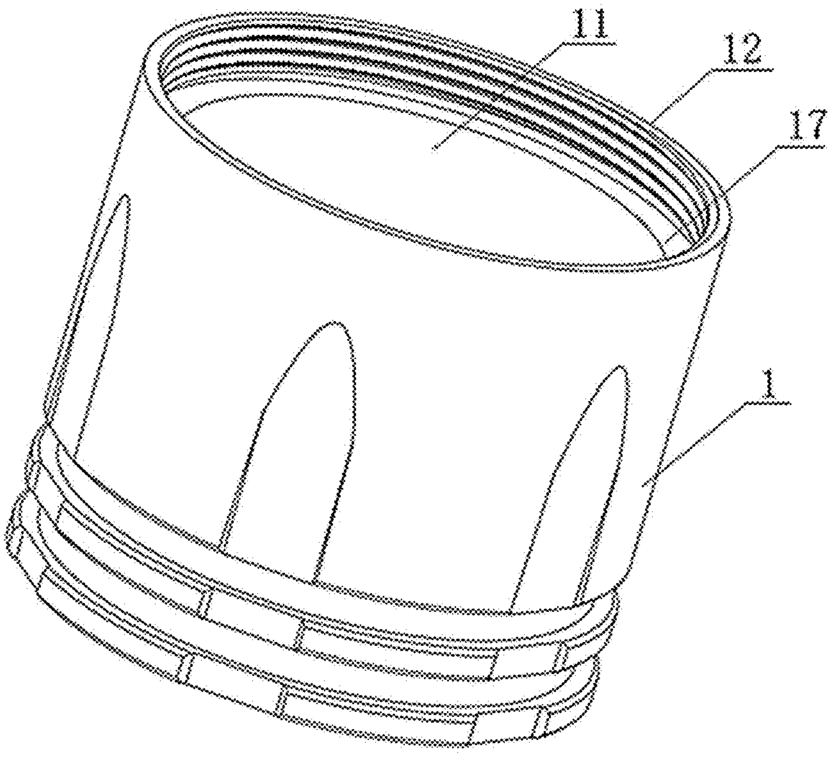
FIG. 11 is a perspective view of the lamp holder of the head light of the present invention.

As shown in FIG. 9 and FIG. 10, a positioning slot 15 is set onto the lamp board 8, and the centering member 9 is equipped with a positioning member 24 that corresponds to the positioning slot 15, where the positioning member 24 is inserted into the positioning slot 15. In this embodiment, since the positioning slot 15 is set onto the lamp board 8, the positioning member 24 set on the centering member 9 can be installed in the positioning slot 15, facilitating a positioning connection between the centering member 9 and the lamp board 8.

As shown in FIG. 1 and FIG. 5, the mounting plate 7 is equipped with a through-hole 16 for the passage of wires connecting the lamp board 8 and the control circuit board 25. It should be noted that there are wires connecting the lamp board 8 and the control circuit board 25. To facilitate the passage of the wires, the mounting plate 7 is equipped with the through-hole 16 for the passage of wires. It should also be noted that the control circuit board 25 can be installed inside the barrel (the barrel refers to the flashlight body) or inside the light head. Specifically, the mounting plate 7 is located inside the hollow structure 11, dividing the hollow structure 11 into two parts. One part is used for installing the lamp board 8, light source 3, light sensor 5 and reflector 2, while the other part is used for installing the control circuit board 25 (as shown in FIG. 5).

As shown in FIG. 1, FIG. 3 and FIG. 5, an outer wall of the reflector 2 is in contact with an inner wall of the hollow structure 11 along the axis of the lamp holder 1. The imaging hole 4 is located on the reflector 2 between the outer wall and the inner wall of the reflector 2. In this embodiment, the reflector 2 is installed inside the hollow structure 11, and since the outer wall of the reflector 2 is in contact with the inner wall of the hollow structure 11 along the axis of the lamp holder 1, it prevents the reflector 2 from wobbing inside the hollow structure 11. Besides, it can also ensure a central installation of the reflector 2 inside the hollow structure 11.

Embodiment 2

As shown in FIG. 1, FIG. 3, FIG. 5 and FIG. 11, a circular mounting platform 17 is formed on the lamp holder 1 at the opening 12. The mounting platform 17 is equipped with a sealing ring 18. A mounting slot 19, which holds a lens 20, is formed at an inner wall of the sealing ring 18. The opening 12 is removably connected to a pressing ring 23 securing the sealing ring 18. In this embodiment, the sealing ring 18 is installed on the mounting platform 17, and the lens 20 is indirectly installed in the opening 12 through the mounting slot 19. The pressing ring 23 is used to press and fix the sealing ring 18, thereby achieving a waterproof seal for the light head. Since there is a removable connection between the pressing ring 23 and the opening 12, it facilitates installation and subsequent maintenance. The lens 20 serves to protect the reflector 2 and the light source 3, and also enhances the uniformity of the emitted light. It should be noted that the opening 12 can be connected to the pressing ring 23 by means of a threaded connection or a snap-fit connection.

Additionally, the lamp holder 1 is equipped with an internal thread at the opening 12, and the pressing ring 23 is equipped with an external thread that is threadedly connected to the internal thread. In this embodiment, a removable connection between the pressing ring 23 and the opening 12 is achieved through the threaded connection between external thread on the pressing ring 23 and the internal thread at the opening 12.

Embodiment 3

A flashlight includes a barrel with a power source inside. The flashlight also includes the light head with a light sensor 5 as described in the above embodiments. The lamp holder 1 is connected to the barrel, and the power source is connected to the control circuit board 25.

The above descriptions are merely preferred embodiments of the present invention and are not intended to limit the invention. Any modifications, equivalent substitutions, and improvements made within the spirit and principles of the present invention should be included within the scope of protection of the claims of the present invention.

The invention claimed is:

1. A light head with a light sensor, wherein the light head includes a lamp holder, a reflector and a control circuit board, wherein the lamp holder equips a hollow structure inside, and an end of the lamp holder is equipped with an opening that connects to the hollow structure; wherein the reflector is installed inside the hollow structure, and one end of the reflector is equipped with an installation port while the other end of the reflector is equipped with a light-emitting port; wherein a light source is installed in the installation port and is electrically connected to the control circuit board; wherein an imaging hole is set in the reflector along the direction of light emission; wherein at an end of the imaging hole away from the opening, there is a light sensor electrically connected to the control circuit board; wherein an inner wall of the imaging hole forms a reflective surface that directs light to the light sensor; wherein another end of the lamp holder is equipped with a mounting plate which equips a lamp board located inside the hollow structure; wherein the light source is connected to the lamp board; wherein the lamp board is electrically connected to the control circuit board, and the light sensor is mounted on the lamp board.

2. The light head according to claim 1, wherein the lamp board is equipped with a centering member, which equips a positioning through-slot; wherein the light source is housed in the positioning through-slot; wherein the centering member is equipped with a first positioning structure, and a bottom of the reflector is equipped with a second positioning structure that corresponds to the first positioning structure, where the second positioning structure is interlocked with the first positioning structure.

3. The light head according to claim 2, wherein the first positioning structure includes at least two positioning pins located on the centering member; wherein the second positioning structure includes at least two positioning holes located on the bottom of the reflector; wherein each positioning pin is respectively inserted into the corresponding positioning hole.

4. The light head according to claim 2, wherein a positioning slot is set onto the lamp board, and the centering member is equipped with a positioning member that corresponds to the positioning slot, where the positioning member is inserted into the positioning slot.

5. The light head according to claim 1, wherein the mounting plate is equipped with a through-hole for the passage of wires connecting the lamp board and the control circuit board.

6. The light head according to claim 1, wherein an outer wall of the reflector is in contact with an inner wall of the hollow structure along the axis of the lamp holder, wherein the imaging hole is located on the reflector between the outer wall and the inner wall of the reflector.

7. The light head according to claim 1, wherein a circular mounting platform is formed on the lamp holder at the opening; wherein the mounting platform is equipped with a sealing ring; wherein a mounting slot, which holds a lens, is formed at an inner wall of the sealing ring; wherein the opening is removably connected to a pressing ring securing the sealing ring.

8. The light head according to claim 7, wherein the lamp holder is equipped with an internal thread at the opening, and the pressing ring is equipped with an external thread that is threadedly connected to the internal thread.

9. A flashlight, including a barrel with a power source inside, wherein the flashlight also includes the light head with a light sensor according to claim 1, wherein the lamp holder is connected to the barrel, and the power source is connected to the control circuit board.

* * * * *